United States Patent
Imai (10) Patent No.: US 9,932,849 B2
(45) Date of Patent: Apr. 3, 2018

(54) FLUID SEAL STRUCTURE OF HEAT ENGINE INCLUDING STEAM TURBINE

(71) Applicant: MITSUBISHI HITACHI POWER SYSTEMS, LTD., Kanagawa (JP)

(72) Inventor: Shunji Imai, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/103,467

(22) PCT Filed: Jan. 23, 2015

(86) PCT No.: PCT/JP2015/051798
§ 371 (c)(1),
(2) Date: Jun. 10, 2016

(87) PCT Pub. No.: WO2015/111688
PCT Pub. Date: Jul. 30, 2015

(65) Prior Publication Data
US 2016/0312636 A1 Oct. 27, 2016

(30) Foreign Application Priority Data
Jan. 27, 2014 (JP) .................................. 2014-012609

(51) Int. Cl.
*F04D 29/08* (2006.01)
*F01D 11/04* (2006.01)
(Continued)

(52) U.S. Cl.
CPC ................ *F01D 11/04* (2013.01); *F01D 5/02* (2013.01); *F01D 11/003* (2013.01); *F01D 25/14* (2013.01);
(Continued)

(58) Field of Classification Search
CPC .... F01D 25/26; F01D 11/003; F05D 2220/31; F05D 2240/55
(Continued)

(56) References Cited

U.S. PATENT DOCUMENTS 8,142,146 B2 * 3/2012 Kawakami .............. F01D 9/047
415/202
2011/0164965 A1 7/2011 Smith et al.

FOREIGN PATENT DOCUMENTS

CN 101372896 2/2009
JP 55-52501 4/1980
(Continued)

OTHER PUBLICATIONS

JP5254774 with English translation of specification.*
(Continued)

*Primary Examiner* — Logan Kraft
*Assistant Examiner* — Jason Fountain
(74) *Attorney, Agent, or Firm* — Wenderoth, Lind & Ponack, L.L.P.

(57) ABSTRACT

A fluid seal structure of a heat engine including a steam turbine includes an inner case which houses a turbine rotor rotatably inside, an outer case which houses the inner case and forms a space through which a fluid can flow between the outer case and an exterior surface of the inner case, a protruding portion protruding into the space from one of the exterior surface of the inner case or an interior surface of the outer case, and a partitioning plate extending into the space from the other one of the exterior surface or the interior surface and being formed annularly in a circumferential direction of the surface. The partitioning plate partitions the space into first and second space sections, and is flexurally deformable in the axial direction of the turbine rotor by an internal fluid pressure difference between the first and second space sections.

10 Claims, 6 Drawing Sheets (51) Int. Cl.
*F16J 15/46* (2006.01)
*F16J 15/16* (2006.01)
*F16J 15/34* (2006.01)
*F01D 11/00* (2006.01)
*F01D 25/14* (2006.01)
*F01D 5/02* (2006.01)
*F01D 25/26* (2006.01)

(52) U.S. Cl.
CPC .......... *F01D 25/26* (2013.01); *F16J 15/164* (2013.01); *F16J 15/3448* (2013.01); *F16J 15/46* (2013.01); *F05D 2220/31* (2013.01); *F05D 2240/55* (2013.01)

(58) Field of Classification Search
USPC ...................................................... 415/174.2
See application file for complete search history.

(56) References Cited

FOREIGN PATENT DOCUMENTS

| | | |
|---|---|---|
| JP | 60-169607 | 9/1985 |
| JP | 62-174506 | 7/1987 |
| JP | 62-284905 | 12/1987 |
| JP | 5-5403 | 1/1993 |
| JP | 5-19501 | 3/1993 |
| JP | 9-324602 | 12/1997 |
| JP | 2009-47123 | 3/2009 |
| JP | 2010-144707 | 7/2010 |
| JP | 2010-285924 | 12/2010 |
| JP | 5254774 B2 * | 8/2013 |

OTHER PUBLICATIONS

Notice of Allowance dated Aug. 12, 2016 in corresponding Korean Application No. 10-2016-7013358 (with English translation).
International Search Report and Written Opinion of the International Searching Authority dated Apr. 28, 2015 in International (PCT) Application PCT/JP2015/051798 with English translation.
Decision to Grant a Patent dated May 20, 2016 in corresponding Japanese Patent Application No. 2014-012609 with English translation.
International Preliminary Report on Patentability and Written Opinion of the International Searching Authority dated Aug. 11, 2016 in International (PCT) Application No. PCT/JP2015/051798 (with English translation).
Notification of First Office Action dated Sep. 28, 2016 in corresponding Chinese Application No. 201580002661.0, with English translation.

* cited by examiner

FLUID SEAL STRUCTURE OF HEAT ENGINE INCLUDING STEAM TURBINE

TECHNICAL FIELD

The present disclosure relates to a fluid seal structure which seals a gap between steam chambers inside a heat engine including a steam turbine.

BACKGROUND ART

A steam turbine, an example of a heat engine, normally includes an inner case accommodating a turbine rotor and an outer case accommodating the inner case. In the steam turbine, high-pressure steam is introduced into the inner case through a steam inlet disposed on the outer case. In the inner case, the introduced high-pressure steam is injected at a high speed, and this steam force applies a rotational force to a plurality of turbine stages of a turbine rotor to rotate the turbine rotor. The high-pressure steam having applied a rotational force to the turbine stages moves from an upstream side toward a downstream side through the turbine stages with its temperature and pressure decreasing, and flows out through an exhaust outlet.

Meanwhile, Patent Document 1 discloses a steam turbine including high-pressure and mid-pressure stages. As disclosed in Patent Document 1, this steam turbine includes a high-mid pressure integration dummy ring between a high-pressure stage and a mid-pressure stage, and a ring-shaped partitioning plate disposed between the high-mid pressure integration dummy ring and an outer case (outer turbine casing). The ring-shaped partitioning plate separates and protects an inner case (inner turbine casing) from mid-pressure steam having a high temperature, and thereby it is possible to reduce thermal stress of the inner case and to reduce stress of bolts fixing the inner case.

The inner case has a structure that is dividable into an upper part and a lower part having butting surfaces which extend in a horizontal direction on rim portions. The upper part and the lower part are fastened with a plurality of bolts to be fixed integrally while the respective butting surfaces of the upper part and the lower part are in contact with each other. The outer case has a configuration similar to that of the inner case.

CITATION LIST

Patent Literature

Patent Document 1: JPS62-284905A (see FIG. 1)

SUMMARY

Problems to be Solved

As described above, in a steam turbine configured to discharge high-pressure steam through a plurality of turbine stages and an exhaust outlet, a part of high-pressure steam having flowed through the plurality of turbine stages may turn into a turbulence flow and enter a space between an outer case and an inner case instead of flowing toward the exhaust outlet. If low-temperature steam having flowed through the plurality of turbine stages flows through the space, the outer case is cooled along the axial direction of a turbine rotor. Meanwhile, if high-pressure steam flows into the space from the opposite side to the exhaust outlet, the temperature of the outer case increases along the axial direction of the turbine rotor. Accordingly, the temperature of the outer case is varied in the axial direction of the turbine rotor, and the difference is greater particularly between a part of the outer case contacting high-temperature steam and a part of the outer case contacting steam with a reduced temperature. Thus, a fastening force of bolts for fastening an upper part and a lower part of the outer case, disposed in the vicinity of a position exposed to rapid temperature reduction, may be weakened.

In this regard, the partitioning plate disclosed in Patent Document 1 may be provided inside the space to partition the space. If the partitioning plate can shut off a flow of low-temperature steam completely, it is possible to prevent a rapid temperature change of the outer case. However, even with a partitioning plate disposed to provide an air-tight seal between space sections on either side of the partitioning plate during assembly of a steam turbine, gaps still may be produced between the partitioning plate and the outer case or between the partitioning plate and the inner case, due to an increased temperature inside the steam turbine or due to a temperature difference generated depending on position, during operation of the steam turbine. Thus, low-temperature steam may flow into an upstream space section and reduce the fastening force of bolts for fastening the upper part and the lower part of the outer case.

Accordingly, it is desirable to develop a seal structure, for a steam turbine with a partitioning plate disposed in a space, capable of providing an air-tight seal between a pair of space sections separated by the partitioning plate without producing a gap during operation of the steam turbine.

In view of this, an object of at least some embodiments of the present invention is to provide a fluid seal structure of a heat engine including a steam turbine, capable of providing an air-tight seal between a pair of space sections partitioned by a partitioning plate during operation of the heat engine.

Solution to the Problems

A fluid seal structure of a heat engine including a steam turbine according to at least some embodiments of the present invention comprises: an inner case which houses a turbine rotor rotatably inside the inner case; an outer case which houses the inner case and forms a space through which a fluid can flow between the outer case and an exterior surface of the inner case; a protruding portion protruding into the space from one of the exterior surface of the inner case or an interior surface of the outer case, the protruding portion being formed into an annular shape in a circumferential direction of the one surface; and a partitioning plate extending into the space from the other one of the exterior surface or the interior surface and being formed in an annular shape in a circumferential direction of the other surface. The partitioning plate partitions the space into a first space section in which the protruding portion is not disposed and which is disposed on a first side with respect to an axial direction of the turbine rotor, and a second space section in which the protruding portion is disposed and which is disposed on a second side with respect to the axial direction of the turbine rotor, and is flexurally deformable in the axial direction of the turbine rotor by an internal fluid pressure difference between the first space section and the second space section. The partitioning plate is configured to contact the protruding portion if flexurally deformed toward the second space section in response to the internal fluid pressure difference.

With the above fluid seal structure of a heat engine including a steam turbine, the internal fluid pressure difference is generated between the first space section and the second space section during operation of the heat engine, and if this pressure difference is such that the pressure of the first space section not accommodating the protruding portion is greater than the pressure of the second space section accommodating the protruding portion, the partitioning plate flexurally deforms toward the second space section in the axial direction of the turbine rotor to contact the protruding portion. Thus, there is no longer a gap between the partitioning plate and the protruding portion. Therefore, even if a fluid in the second space section, which is disposed on the second side with respect to the axial direction of the turbine rotor, tries to flow into the first space section, which is disposed on the first side with respect to the axial direction of the turbine rotor, it is possible to shutoff the flow of the fluid toward the first space section securely with the partitioning plate. Thus, it is possible to provide a fluid seal structure of a heat engine including a steam turbine, capable of providing an air-tight seal between a pair of the first space section and the second space section partitioned by a partitioning plate during operation of the heat engine.

In some embodiments, the partitioning plate is formed to have a thickness, in the axial direction of the turbine rotor, reducing outward in a radial direction of the turbine rotor, at least at a distal end portion of the partitioning plate.

In this case, at least the distal end portion of the partitioning plate is formed in a tapered shape, and thus bending stiffness of the partitioning plate decreases toward the distal end. Thus, if a force in the axial direction of the turbine rotor directed toward the protruding portion is applied to the partitioning plate, the distal end portion of the partitioning plate flexurally deforms toward the protruding portion while being supported on an inner end of the partitioning plate with respect to the radial direction of the turbine rotor. Thus, it is possible to make at least the distal end portion of the partitioning plate contact the protruding portion securely. Further, it is possible to provide an air-tight seal between a pair of the first space section and the second space section partitioned by the partitioning plate during operation of the heat engine.

In some embodiments, the outer case includes a fluid supply path configured to supply the fluid to the inner case. Further, the inner case includes a driving flow path configured to direct the fluid supplied through the fluid supply path to the turbine rotor to drive the turbine rotor. Still further, the driving flow path and the first space section communicate with each other via a connection flow path.

In this case, it is possible to supply fluid flowing through the driving flow path to the first space section via the connection flow path. The fluid flowing through the driving flow path applies a rotational force to the turbine rotor, and thus the driving flow path is configured to pressurize the fluid. Thus, it is possible to increase the internal fluid pressure of the first space section by introducing the fluid flowing through the driving flow path to the first space section. Thus, it is possible to further increase the internal fluid pressure difference between the first space section and the second space section, and to make the partitioning plate contact the protruding portion even more readily. Accordingly, it is possible to provide a fluid seal structure of a heat engine including a steam turbine, capable of providing an air-tight seal between a pair of the first space section and the second space section partitioned by the partitioning plate during operation of the heat engine.

In an embodiment, an annular seal member is disposed on a side surface of the protruding portion facing the partitioning plate, the annular seal member comprising a material which has a greater linear expansion coefficient than the protruding portion.

In this case, if the partitioning plate flexurally deforms toward the protruding portion to contact the annular seal member, the annular seal member deforms. Further, if the partitioning plate flexurally deforms toward the protruding portion further, the partitioning plate contact the protruding portion while the annular seal member is being deformed. Thus, the partitioning plate contacts the annular seal member besides the protruding portion, and thereby it is possible to improve an air-tight sealing property between the pair of space sections even further.

Advantageous Effects

According to at least some embodiments of the present invention, it is possible to provide a fluid seal structure of a heat engine including a steam turbine, capable of providing an air-tight seal between a pair of space sections partitioned by a partitioning plate during operation of the heat engine.

DETAILED DESCRIPTION

An embodiment of a fluid seal structure of a heat engine including a steam turbine of the present invention will now be described with reference to the accompanying drawings. A steam turbine will be described as an example of a heat engine in the present embodiment. It is intended, however, that unless particularly specified, dimensions, materials, shapes, relative positions and the like of components described in the embodiments shall be interpreted as illustrative only and not intended to limit the scope of the present invention.

Figure 1:
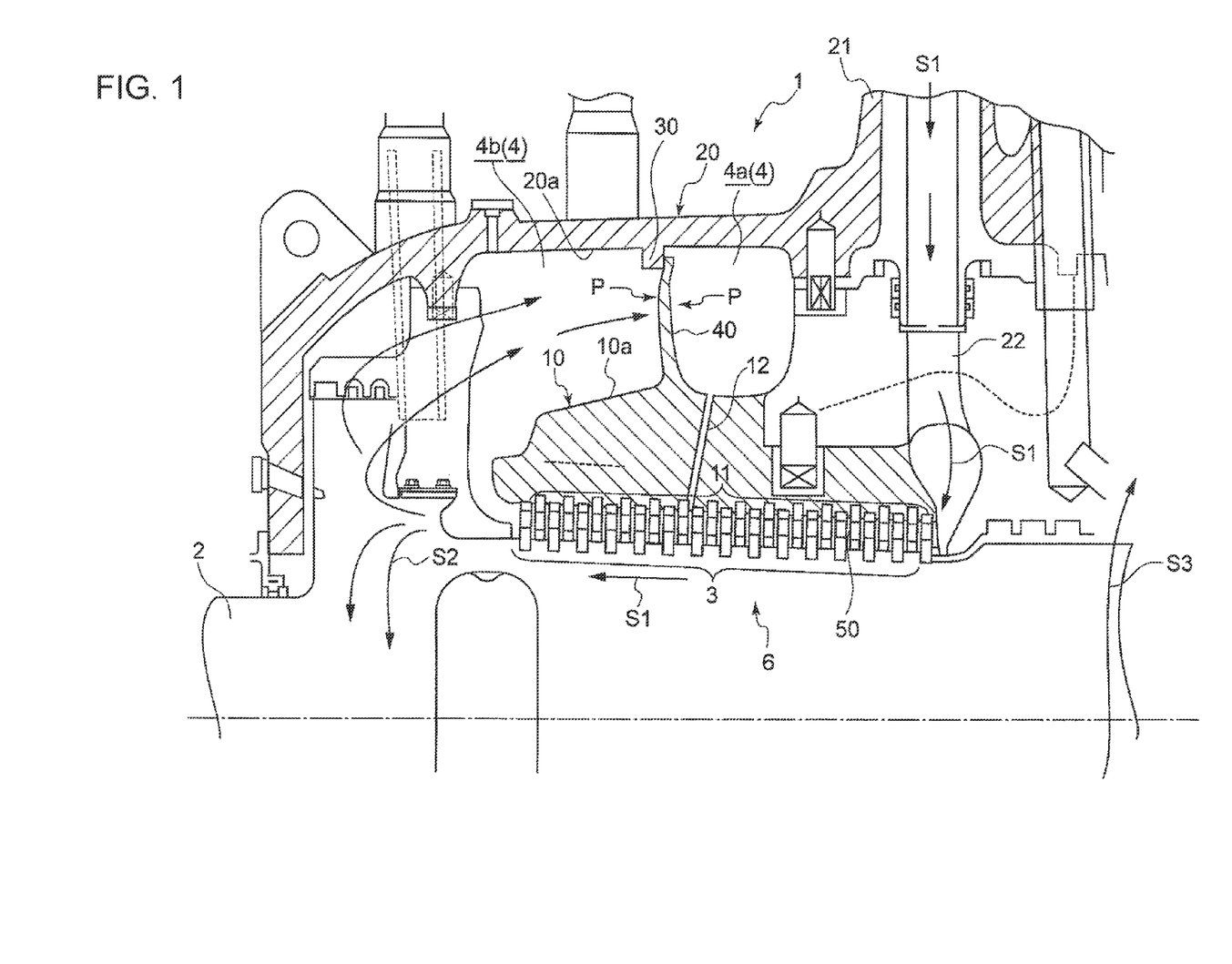
FIG. 1 is a partial cross-sectional view of a steam turbine, showing a configuration example of a fluid seal structure.
Figure 2:
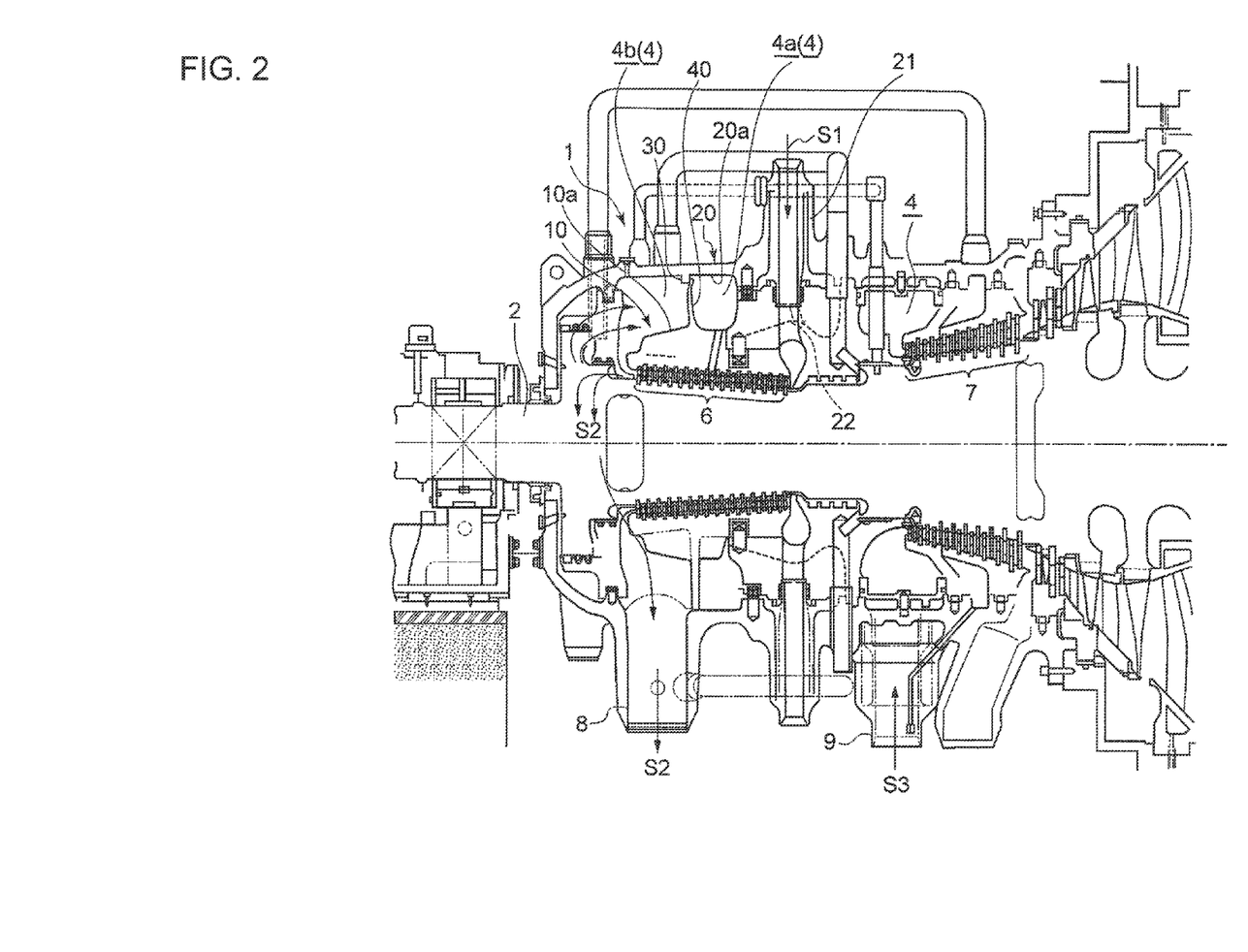
FIG. 2 is an interior structural view of a steam turbine according to an embodiment.

As illustrated in FIG. 1 (partial cross-sectional view) and FIG. 2 (interior structural view), a fluid seal structure 1 of a steam turbine includes an inner case 10 housing a turbine rotor 2 inside rotatably, an outer case 20 housing the inner case 10 and forming a space 4 through which steam can flow, between the outer case 20 and an exterior surface 10a of the inner case 10, a protruding portion 30 protruding from an interior surface 20a of the outer case 20 into the space 4 and formed in an annular shape in a circumferential direction of the interior surface 20a, and a partitioning plate 40 extending into the space 4 from the exterior surface 10a of the inner case 10 and formed in an annular shape in the circumferential direction of the exterior surface 10a. The partitioning plate 40 divides the space 4 into the first space section 4a and the second space section 4b disposed on either side of the partitioning plate 40 with respect to the axial direction of the turbine rotor 2. The partitioning plate 40 is flexurally deformable in the axial direction of the turbine rotor 2 in response to an internal pressure difference of steam between the first space section 4a and the second space section 4b.

In some embodiments, the inner case 10 is made of metal (e.g. Cr cast steel), and includes a stationary blade row 11 (see FIG. 1) to be engaged with a rotating blade row 3 (see FIG. 1) of the turbine rotor 2 extending in the axial direction of the turbine rotor 2. Hereinafter, the rotating blade row 3 and the stationary blade row 11 will be collectively referred to as a "high-pressure stage 6." A driving flow path 50 (see FIG. 1) is formed between the rotating blade row 3 and the stationary blade row 11, where high-temperature and high-pressure steam can flow through. When high-temperature and high-pressure steam flows through the driving flow path 50, the rotating blade row 3 receives a flow of the high-temperature and high-pressure steam to rotate the turbine rotor 2.

Figure 3:
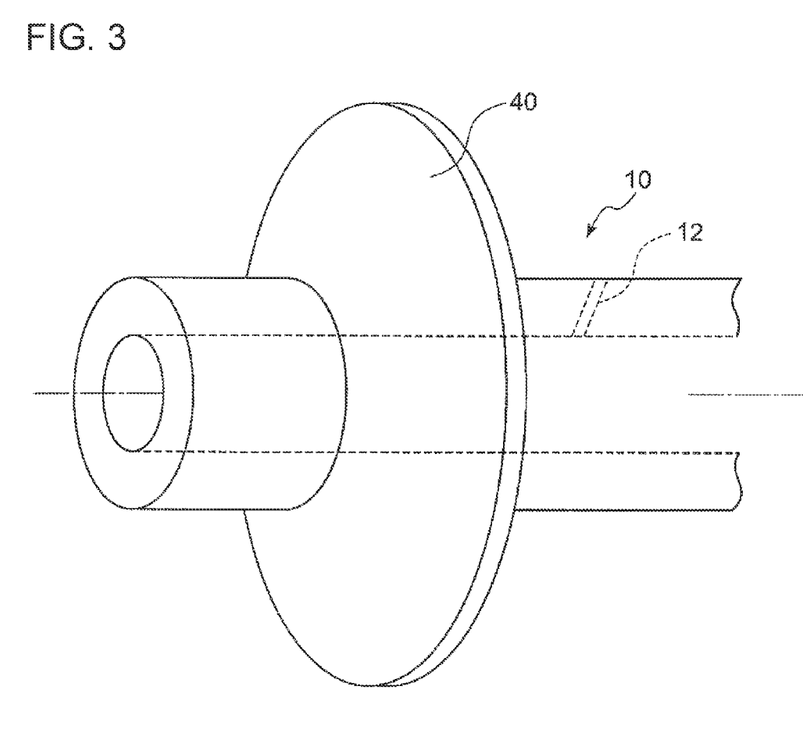
FIG. 3 is a schematic perspective view of an inner case including a seal ring according to an embodiment.

The inner case 10 is configured to be dividable into an upper part and a lower part having butting surfaces (not depicted) extending in the horizontal direction on rim portions, and the turbine rotor 2 is disposed in the lower part of the inner case 10. The upper part of the inner case 10 is disposed on the lower part, and the upper part and the lower part of the inner case 10 are fastened with a plurality of bolts while the butting surfaces of the parts are in contact, and thereby integrated and fixed. As illustrated in FIGS. 1 and 3 (schematic perspective views), the partitioning plate 40 is formed on the exterior surface 10a of the inner case 10 in an annular shape in the circumferential direction of the exterior surface 10a, so as to protrude outward in the radial direction of the turbine rotor 2. The partitioning plate 40 and the inner case 10 are formed integrally as one piece. The structure of the partitioning plate 40 will be described below in detail.

In some embodiments, the outer case 20 is made of metal (e.g. Cr—Mo cast steel), and is configured to be dividable into an upper part and a lower part having butting surfaces (not depicted) extending in the horizontal direction on rim portions, similarly to the inner case 10. The upper part of the outer case 20 is disposed on the lower part, and the upper part and the lower part of the outer case 20 are fastened with a plurality of bolts while the butting surfaces of the parts are in contact, and thereby integrated and fixed.

As illustrated in FIGS. 1 and 2, the outer case 20 has a space 4 through which steam can flow, formed between the interior surface 20a of the outer case 20 and the exterior surface 10a of the inner case 10, in a state where the outer case 20 is housing the inner case 10. A high-pressure steam inlet 21 for introducing high-temperature and high-pressure steam is disposed on an upper portion of the outer case 20, and the high-pressure steam inlet 21 communicates with the driving flow path 50 of the inner case 10 via a fluid supply path 22. Thus, high-temperature and high-pressure steam is supplied to the driving flow path 50 through the high-pressure steam inlet 21 and the fluid supply path 22. To the right of the high-pressure steam inlet 21, with respect to the axial direction of the turbine rotor 2, disposed is a mid-pressure stage 7 which extracts a rotational force from mid-pressure steam. High-temperature and high-pressure steam S3 is supplied to the mid-pressure stage 7 via the space 4.

Further, to the left of the high-pressure stage 6, with respect to the axial direction of the turbine rotor 2, disposed is an exhaust outlet 8 (see FIG. 2) for discharging low-pressure steam discharged from the driving flow path 50. Low-pressure steam discharged from the driving flow path 50 flows through the space 4 to be discharged through the exhaust outlet 8, and then is heated by a re-heater (not depicted).

In some embodiments, the protruding portion 30 is formed on the interior surface 20a of the outer case 20 facing the exterior surface 10a of the inner case 10 with the stationary blade row 11 of the high-pressure stage 6 formed thereon. The protruding portion 30 is formed in an annular shape in the circumferential direction on the interior surface 20a of the outer case 20, integrally with the outer case 20. The protruding portion 30 has a rectangular shape in a cross-sectional view. It should be noted that a cross-sectional shape of the protruding portion 30 is not limited to a rectangular, and may be a trapezoid.

Figure 4:
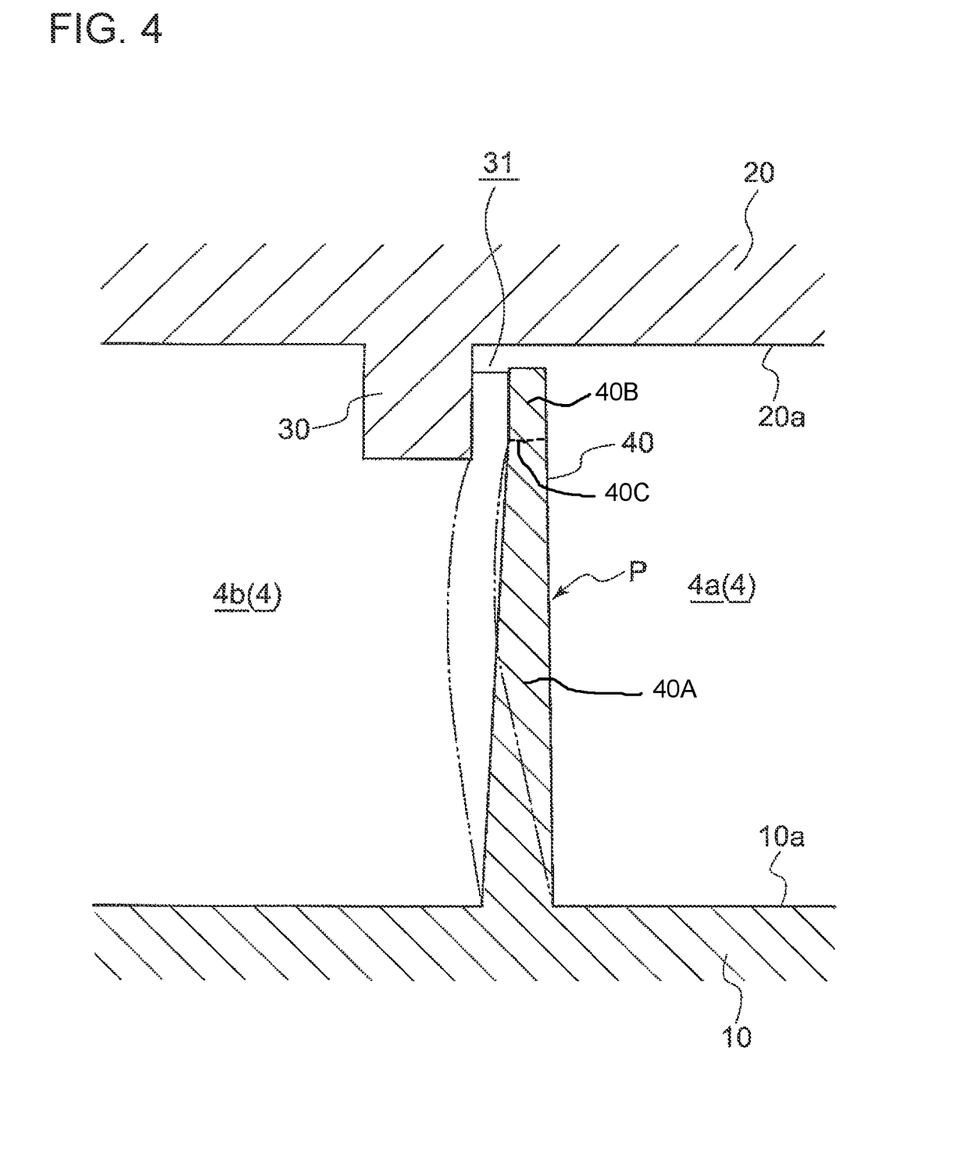
FIG. 4 is a partial cross-sectional view of a steam turbine for describing a function of a seal ring according to an embodiment.

As illustrated in FIGS. 1 and 4 (partial cross-sectional views), the protruding portion 30 is disposed slightly offset toward the left from the partitioning plate 40 with respect to the axial direction of the turbine rotor 2. Specifically, the protruding portion 30 is protruding into the second space section 4b. Thus, when the partitioning plate 40 is not flexurally deformed, a gap 31 is formed between a distal end portion of the partitioning plate 40 and the protruding portion 30. Accordingly, the partitioning plate 40 and the protruding portion 30 do not need to be in contact during assembly work of the outer case 20, and thereby it is possible to facilitate the assembly work.

The partitioning plate 40 being capable of contacting the protruding portion 30 is made of metal (e.g. Cr cast steel) and has elasticity, and is formed integrally with the inner case 10. The partitioning plate 40 includes a tapering section 40A, which extends from the exterior surface 10a of the inner case 10, and a contacting section 40B, which contacts the protruding portion 30. The contacting section 40B extends from a distal end surface of the tapering section 40A and has a thickness equal to a thickness of the distal end surface of the tapering section 40A at a junction 40C. The partitioning plate 40 has a thickness (thickness in the axial direction of the turbine rotor 2) reducing outward in the radial direction of the turbine rotor 2 from an exterior surface of the inner case 10. Thus, it is possible to reduce bending stiffness of the partitioning plate 40 against a pressure P applied by high-temperature and high-pressure steam in the axial direction of the turbine rotor 2. Thus, the partitioning plate 40 can deform flexurally with less difficulty in the axial direction of the turbine rotor 2 in response to the pressure P applied to a side surface of the partitioning plate 40 in the axial direction of the turbine rotor 2.

Figure 5:
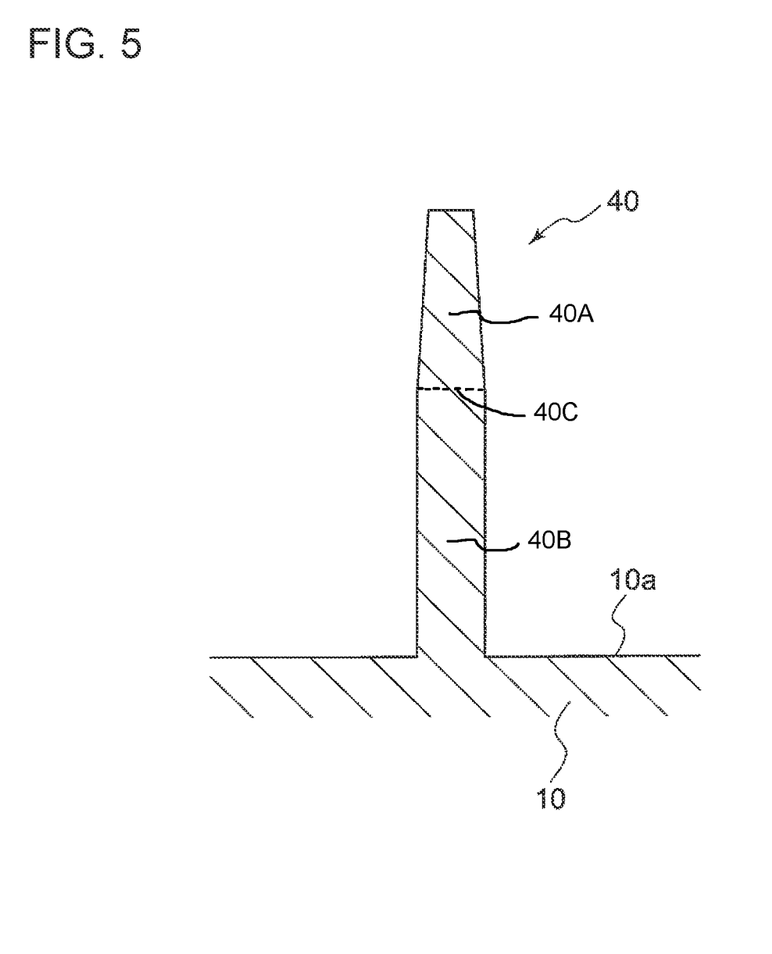
FIG. 5 is a partial cross-sectional view of another seal ring according to an embodiment.

It should be noted that the shape of the partitioning plate 40 is not limited to a shape that starts to taper from the exterior surface 10a of the inner case 10, and the partitioning plate 40 may be more tapered at a distal end side than at a root side, as illustrated in FIG. 5. Regarding this, the partitioning plate 40 includes a root side section 40B, which extends from the exterior surface 10a of the inner case 10, and a tapering section 40A, which is connected to a distal end surface of the root side section 40B. The tapering section 40A has a thickness equal to a thickness of the distal end surface of the root side section 40B at a junction 40C.

As described above, as illustrated in FIGS. 1 and 2, in the fluid seal structure 1 of a steam turbine according to some embodiments, high-temperature and high-pressure steam S1 (e.g. 500° C. to 600° C., 170 to 240 kg/cm$^2$) is supplied to the high-pressure steam inlet 21 and flows inside the inner case 10 to be introduced at a high speed into the driving flow path 50 of the high-pressure stage 6. As the high-temperature and high-pressure steam S1 flows through the driving flow path 50 at a high speed, the high-temperature and high-pressure steam S1 applies a rotational force to the rotating blade row 3 of the high-pressure stage 6, and gradually decreases in temperature and pressure. A substantial part of this steam S2 with a reduced temperature (e.g. 300 to 400° C., 35 to 60 kg/cm²) flows through the space 4 to be discharged through the exhaust outlet 8 and re-heated.

However, a part of the steam S2 with a reduced temperature may turn into a turbulence flow in the space 4 and flow into the space 4 between the outer case 20 and the inner case 10 without flowing toward the exhaust outlet 8. If the steam S2 with a reduced temperature flows through the space 4, the outer case 20 is cooled along the axial direction of the turbine rotor 2.

Meanwhile, to the right of the high-pressure steam inlet 21, with respect to the axial direction of the turbine rotor 2, the mid-pressure stage 7 is disposed as described above, and high-temperature and high-pressure steam S3 is supplied to the mid-pressure stage 7 via the space 4. Thus, the high-temperature and high-pressure steam S3 increases the temperature of the outer case 20 on the right side of the high-pressure steam inlet 21 with respect to the axial direction of the turbine rotor 2. Thus, the temperature of the outer case 20 is varied between different positions in the axial direction of the turbine rotor 2, and the difference is greater particularly between a part of the outer case 20 contacting high-temperature steam and a part of the outer case 20 contacting the steam S2 with a reduced temperature. Accordingly, while the temperature of the outer case 20 rapidly changes at some parts, a part of the outer case 20 with an increased temperature expands and a part of the outer case 20 with a reduced temperature contracts, which may reduce a fastening force of bolts fastening and fixing the upper part and the lower part of the outer case 20.

In this regard, according to the present embodiment, if a pressure difference between high-temperature and high-pressure steam S3 inside the first space section 4a and low-temperature and low-pressure steam S2 inside the second space section 4b exceeds a predetermined value, the partitioning plate 40 flexurally deforms toward the protruding portion 30 and the distal end portion of the partitioning plate 40 contacts the protruding portion 30 air-tightly. Herein, the first space section 4a is a section of the space 4 on the right side of the partitioning plate 40 with respect to the axial direction of the turbine rotor 2, and the second space section 4b is a section of the space 4 on the left side of the partitioning plate 40 with respect to the axial direction of the turbine rotor 2.

Accordingly, the first space section 4a and the second space section 4b are shut off from each other, and thereby it is possible to prevent the low-temperature and low-pressure steam S2 from flowing into the first space section 4a. Thus, only high-temperature and high-pressure steam S3 flows into the first space section 4a, and thereby it is possible to relatively reduce a temperature difference in the axial direction of the turbine rotor 2 for the outer case 20 that high-temperature and high-pressure steam S3 contacts. Further, only low-temperature and low-pressure steam S2 flows into the second space section 4b, and thereby it is possible to relatively reduce a temperature difference in the axial direction of the turbine rotor 2 for the outer case 20 that low-temperature and low-pressure steam S2 contacts. That is, it is possible to prevent a rapid change in a temperature gradient, in the axial direction of the turbine rotor 2, for the outer case 20 contacting steam in each of the first space section 4a and the second space section 4b. Thus, it is possible to prevent loosening of bolts for fastening and fixing the upper part and the lower part of the outer case 20.

The length of the first space section 4a is longer than that of the second space section 4b, with respect to the axial direction the turbine rotor 2. Thus, the outer case 20 has a relatively small temperature difference between an end of the first space section 4a adjacent to the second space section 4b and a part contacting low-temperature and low-pressure steam S2. Thus, there is no risk of loosening of bolts disposed on the outer case 20 at an adjoining position between the first space section 4a and the second space section 4b.

Next, an illustrative embodiment will now be described in detail with reference to FIGS. 1, 6A, and 6B. In the illustrative embodiment depicted in FIG. 1, the inner case 10 includes a connection flow path 12 through which the driving flow path 50 communicates with the first space section 4a. The connection flow path 12 can supply high-pressure steam flowing through the driving flow path 50 to the first space section 4a to adjust a pressure inside the first space section 4a. The number of the connection flow path 12 is selected in accordance with a pressure required in the first space section 4a. Thus, the connection flow path 12 makes it possible to set a pressure inside the first space section 4a optionally, and thereby it is possible to design the outer case 20 and the inner case 10 exposed to steam inside the first space section 4a with optimum material and thickness.

Figure 6A:
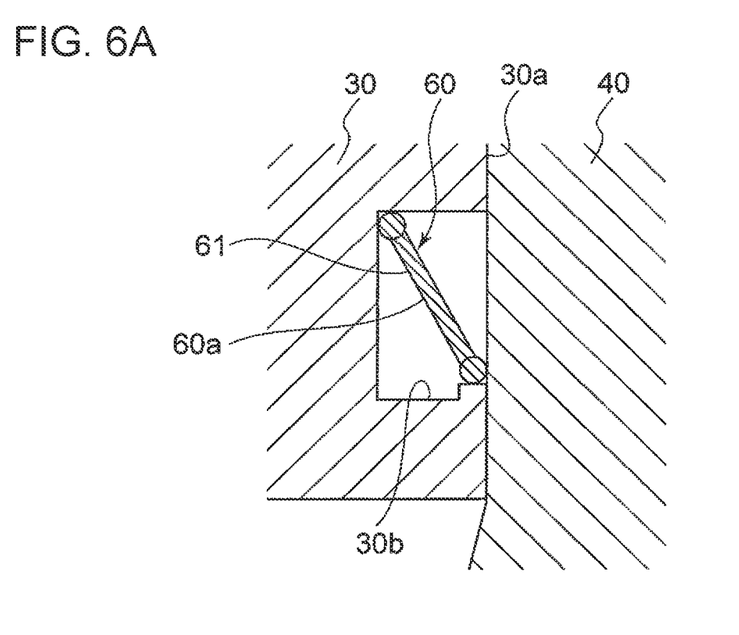
FIG. 6A is a partial cross-sectional view of another seal ring according to an embodiment.
Figure 6B:
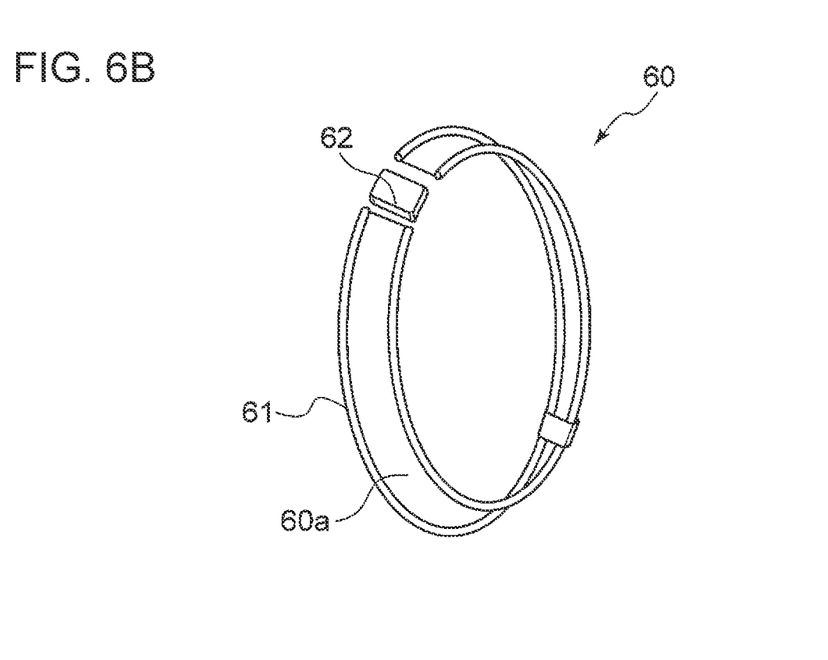
FIG. 6B is a perspective view of the seal ring.

In the illustrative embodiment depicted in FIGS. 6A and 6B, an annular seal member 60 is disposed on a side surface 30a of the protruding portion 30 facing the partitioning plate 40, as illustrated in FIG. 6A. The annular seal member 60 is formed of a material having a greater linear expansion coefficient than the protruding portion 30, such as austenite stainless steel and Inconel. The annular seal member 60 is mounted inside an annular groove 30b disposed on the side surface 30a of the protruding portion 30. The annular seal member 60 has a side surface 60a of a truncated conical shape and is formed into an annular shape, so as to have an outer diameter increasing from an end toward the opposite end in the axial direction.

The annular seal member 60 includes a seal body 61 formed in a band shape and a socket 62 connecting opposite ends of the seal body 61 to form the seal body 61 into an annular shape. While the annular seal member 60 is not in contact with the partitioning plate 40, an end portion of a side of the annular seal member 60 with respect to the axial direction protrudes from the annular groove 30b. While the annular seal member 60 is in contact with the partitioning plate 40, the annular seal member 60 flexurally deforms toward the other side with respect to the axial direction of the annular seal member 60. Thus, if the partitioning plate 40 contacts the protruding portion 30, the partitioning plate 40 contacts the protruding portion 30 and also the annular seal member 60, and thereby it is possible to improve an air-tight sealing property between the first space section 4a (see FIG. 4) and the second space section 4b (see FIG. 4) even further.

The embodiments of the present invention have been described above. However, the present invention is not limited thereto, and various modifications may be applied as long as they do not depart from the object of the present invention. For instance, the present invention can be applied not only to a steam turbine but also to a gas turbine, and the above described embodiments can be implemented in combination.

DESCRIPTION OF REFERENCE NUMERALS

1 Fluid seal structure of steam turbine
2 Turbine rotor

3 Rotating blade row
4 Space
4a First space section
4b Second space section
6 High-pressure stage
7 Mid-pressure stage
8 Exhaust outlet
10 Inner case
10a Exterior surface
11 Stationary blade row
12 Connection flow path
20 Outer case
20a Interior surface
21 High-pressure steam inlet
30 Protruding portion
30a, 60a Side surface
30b Annular groove
31 Gap
40 Partitioning plate
50 Driving flow path
60 Annular seal member
61 Seal body
62 Socket

The invention claimed is:

1. A steam turbine comprising:
an inner case which houses a turbine rotor rotatably inside the inner case, and includes a driving flow path having an upstream end and a downstream end, a stationary blade row and a rotating blade row being arranged in the driving flow path;
an outer case which houses the inner case, an interior surface of the outer case and an exterior surface of the inner case defining a space therebetween; and
a partitioning plate extending radially into the space from one surface of the exterior surface or the interior surface and being formed in an annular shape in a circumferential direction of the turbine rotor, wherein
the partitioning plate is configured to partition the space into a first space section which is disposed toward the upstream end of the driving flow path with respect to an axial direction of the turbine rotor, and a second space section which is disposed toward the downstream end of the driving flow path with respect to the axial direction of the turbine rotor, the second space section being connected to the downstream end of the driving flow path, and
the first space section is connected to an intermediate portion of the driving flow path located between the upstream end and the downstream end by a connection flow path.

2. The steam turbine according to claim 1, wherein
the partitioning plate partitions the space into the first space section and the second space section by sealing a gap between the partitioning plate and another surface of the exterior surface or the interior surface at least during operation of the steam turbine.

3. The steam turbine according to claim 2, wherein
the partitioning plate is flexurally deformable in the axial direction of the turbine rotor, and
the partitioning plate is deformed during operation of the steam turbine to seal the gap.

4. The steam turbine according to claim 2, further comprising an annular seal member disposed in the gap.

5. The steam turbine according to claim 1, wherein the connection flow path connects to the intermediate portion of the driving flow path at a position where the stationary blade row and the rotating blade row are arranged.

6. A fluid seal structure of a heat engine including a steam turbine, comprising:
an inner case which houses a turbine rotor rotatably inside the inner case;
an outer case which houses the inner case and forms a space through which a fluid can flow between the outer case and an exterior surface of the inner case;
a protruding portion protruding into the space from one surface of the exterior surface of the inner case or an interior surface of the outer case, the protruding portion being formed into an annular shape in a circumferential direction of the one surface; and
a partitioning plate extending into the space from another one surface of the exterior surface or the interior surface and being formed in an annular shape in a circumferential direction of the another one surface,
the partitioning plate
partitioning the space into a first space section in which the protruding portion is not disposed and which is disposed on a first side with respect to an axial direction of the turbine rotor, and a second space section in which the protruding portion is disposed and which is disposed on a second side with respect to the axial direction of the turbine rotor, and
being flexurally deformable in the axial direction of the turbine rotor by an internal fluid pressure difference between the first space section and the second space section,
wherein the partitioning plate is configured to contact the protruding portion only if flexurally deformed toward the second space section in response to the internal fluid pressure difference.

7. The fluid seal structure of the heat engine including the steam turbine according to claim 6, wherein
the partitioning plate is formed to have a thickness, in the axial direction of the turbine rotor, reducing outward in a radial direction of the turbine rotor at least at a distal end portion of the partitioning plate.

8. The fluid seal structure of the heat engine including the steam turbine according to claim 6,
wherein the outer case includes a fluid supply path configured to supply the fluid to the inner case,
wherein the inner case includes a driving flow path configured to direct the fluid supplied through the fluid supply path to the turbine rotor to drive the turbine rotor, and
wherein the driving flow path and the first space section communicate with each other via a connection flow path.

9. The fluid seal structure of the heat engine including the steam turbine according to claim 6, further comprising
an annular seal member disposed on a side surface of the protruding portion facing the partitioning plate, the annular seal member comprising a material which has a greater linear expansion coefficient than the protruding portion.

10. The fluid seal structure of the heat engine including the steam turbine according to claim 6, wherein the internal fluid pressure difference between the first space section and the second space section is an internal fluid pressure difference generated during operation of the heat engine.

* * * * *